United States Patent [19]

Bisa et al.

[11] 4,270,698

[45] Jun. 2, 1981

[54] AEROSOL FORMING DEVICE

[76] Inventors: Karl Bisa; Thomas Bisa, both of Am Wilzenberg 32, 5949 Grafschaft, Fed. Rep. of Germany

[21] Appl. No.: 98,835

[22] Filed: Nov. 30, 1979

Related U.S. Application Data

[60] Continuation-in-part of Ser. No. 856,008, Nov. 30, 1977, abandoned, which is a continuation-in-part of Ser. No. 823,327, Aug. 10, 1977, abandoned, which is a continuation of Ser. No. 722,573, Sep. 13, 1976, abandoned, which is a division of Ser. No. 581,847, May 29, 1975, abandoned.

[51] Int. Cl.[3] .......................... B64D 1/18; B05B 3/08

[52] U.S. Cl. .............................. 239/171; 239/214.15; 239/214.17; 239/214.25

[58] Field of Search .................. 239/171, 214, 214.11, 239/214.13, 214.15, 214.17, 214.21, 214.25, 215, 222.13, 223, 224, 419, 419.3, 422, 424, 426

[56] References Cited

U.S. PATENT DOCUMENTS 1,029,818 6/1912 Noble ............................ 239/214.11
1,543,235 6/1925 Scheminger, Jr. ............. 239/214.25
2,738,837 3/1956 McGillis et al. ............... 239/214.25

FOREIGN PATENT DOCUMENTS 131306 2/1929 Switzerland ....................... 239/214.25

*Primary Examiner*—Andres Kashnikow
*Attorney, Agent, or Firm*—LeBlanc, Nolan, Shur & Nies

[57] ABSTRACT

Apparatus for producing aerosols comprises an arrangement whereby materials to be admixed and dispersed enter a moving propellant stream at a region of decreasing velocity. In a preferred form this apparatus comprises a supply of one or more fluent materials to be dispersed, a rotatable distribution device having at least two members axially separated by a space and peripherally formed to provide a substantially annular discharge outlet for that space when the device is rotated, structure providing an annular stream of gas moving substantially parallel to the axis of rotation of the distribution device and past the outlet, and one or more material feed passages between the supply and space whereby during operation material may be continually fed into the space and thrown outward into annular air stream and against a surrounding baffle having such contour as to present a DeLaval type discharge for the device.

9 Claims, 4 Drawing Figures

AEROSOL FORMING DEVICE

This is a continuation-in-part of our application Ser. No. 856,008 filed Nov. 30, 1977 (now abandoned) as a continuation-in-part of Ser. No. 823,327 filed Aug. 10, 1977 (now abandoned) as a continuation of Ser. No. 722,573 filed Sept. 13, 1976 (now abandoned) which in turn was a division of Ser. No. 581,847 filed May 29, 1975 (now abandoned).

This invention relates to apparatus for the formation of aerosols on a large scale. In an important embodiment it relates to the formation of free aerosol clouds in the atmosphere but the devices hereinafter described are capable of producing aerosols generally.

An aerosol as contemplated herein is a suspension of solid and/or liquid particles in air or another gas, the term gas being used herein to denote the media containing the particles.

In the invention particles of fluent material or materials to be dispersed in the aerosol are introduced into an air or other gas stream at a point of decreasing velocity of the air stream passing through the apparatus and this is an important object.

More specifically in most embodiments the particles to be dispersed in the aerosol are centrifugally or otherwise discharged outwardly into an axially moving air stream and larger particles may pass through the stream to impact upon a baffle to be thereby further reduced in size before being incorporated into the air stream, and this is an important object of the invention.

Specific to the foregoing object the invention contemplates a baffle contoured to provide a Laval type nozzle discharge.

A specific object of the invention is to provide novel apparatus wherein materials to be dispersed in the aerosol are discharged into spaces between rotatable members whereby they are mixed and centrifugally thrown outwardly into an annular air stream.

A further object of the invention is to provide a novel aerosol forming apparatus wherein various organizations of members which may be stationary or rotatable are provided in a distribution disc assembly to define separate spaces wherein respectively material to be dispersed and a gas under pressure are introduced and combined at peripheral discharge outlets where they intersect an annular air or like gas stream. The apparatus may be stationary or mobile, a self-contained motor assembly being provided where the apparatus is a mobile vehicle such as a rocket or an aeroplane.

Further novel features and other objects of this invention will become apparent from the following detailed description, discussion and the appended claims taken in conjunction with the accompanying drawings.

Figure 1:
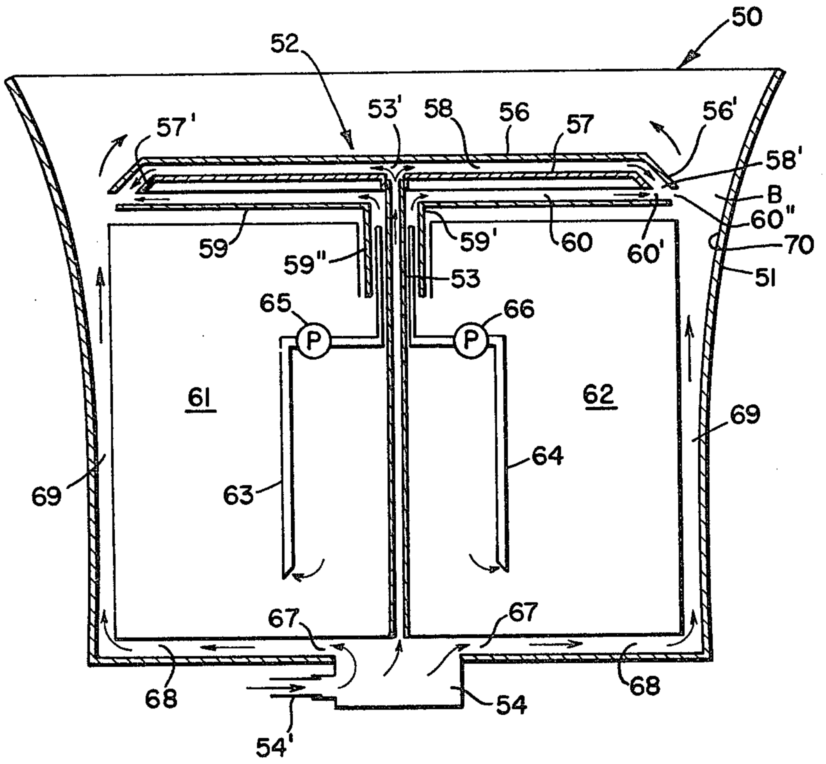
FIG. 1 is a sectional partly diagrammatic view showing an aerosol producing device representing one mode of implementation of the invention.

In the embodiment of FIG. 1, the aerosol producing device 50 comprises an annular housing wall 51 having an open end extending past the outer periphery of a distributor disc assembly 52 that is preferably symmetrical about the axis of a hollow tube or shaft 53 arising vertically from a chamber 54 having an inlet 54' for compressed air which flows upwardly within shaft or tube 53.

Disc assembly 52 comprises an outer imperforate disc 56 fixed with respect to the tube or shaft 53. Disc 56 has an outer imperforate rim 56' inclined at a suitable angle (30°–45°). An inner imperforate disc 57 is secured on tube or shaft 53, preferably with provision for axial adjustment along the tube or shaft, and its outer peripheral rim 57' is inclined generally parallel and similarly to rim 56'. The foregoing defines a predetermined relatively narrow space 58 between the discs 56 and 57 that terminates in a first annular discharge outlet 58' at the outer periphery. Openings 53' in shaft 53 enable pressurized air from hollow tube or shaft 53 to enter space 58 for a purpose to appear.

An inner imperforate disc 59 is secured to tube or shaft 53 as by a perforated spider 59' so as to define a space 60 between discs 57 and 59, and discs 57 and 59 are so relatively formed that space 60 terminates in a second annular discharge outlet 60' adjacent the first annular discharge outlet 58'. The discs 56 and 59 are so relatively formed as to provide a third annular discharge outlet 60'' that is common to discharge outlets 58' and 60' around its inner periphery and thus the third discharge outlet 60'' effectively surrounds both the first and second annular discharge outlets.

As shown housing wall 51 extends around tanks 61 and 62 containing the material to be dispersed in the aerosol cloud, and pipes 63 and 64 having adjustable pump units 65 and 66 respectively extend from the tanks into the interior of a hollow sleeve 59'' projecting inwardly from disc 59.

Chamber 54 is connected by inlet 54' to a suitable source of air pressure (not shown). Air under pressure may thus be delivered continually to space 58 during operation. Other outlets from chamber 54 pass through passages 68 leading to an annular longitudinal passage 69 between tanks 61, 62 and housing 51, wherein an annular axial stream or column of air passes continually along passage 69. Passage 69 is defined by cylindrical walls initially so that the axially moving annular air column is initially of uniform cross section.

As shown in FIG. 1, housing wall 51 diverges uniformly outwardly where it passes the distributor disc assembly thereby providing an outwardly flaring smoothly longitudinally curved baffle surface 70 surrounding the third annular discharge outlet 60'' in an annular region indicated at B. As also shown the outward flare of the baffle surface 70 continues a substantial distance past the distributor disc assembly.

In operation chamber 54 continually delivers air under pressure through tube or shaft 53 into space 58, and through conduits 68 into annular passage 69. The fluent material from the tanks 61 and 62 is pumped through the pipes 63 and 64 and it enters space 60 wherein it becomes a relatively turbulent stream discharged outwardly at outlet 60' to join the pressurized air stream discharge from outlet 58', and all of this mixture passes through outlet 60'' and enters the axially moving annular column of pressurized air in the region B.

The outward flare of baffle surface 70 provides in effect a Laval type nozzle wherein the axially moving annular air stream reduces in velocity while correspondingly increasing in pressure as it receives the outwardly moving radially directed annular stream containing mixed air and fluent material. This promotes additional turbulence and admixture of the material with air while the radially directed stream from outlet 60″ passes into and through the annular longitudinal air stream to impact baffle surface 70. The impact of the material upon baffle surface 70 serves to even further subdivide at least the larger particles of the fluent material and this combined with the turbulence of the intersecting air streams results in very fine particles being formed to be discharged as an aerosol cloud or body through the outwardly flaring end of baffle 70.

Figure 2:
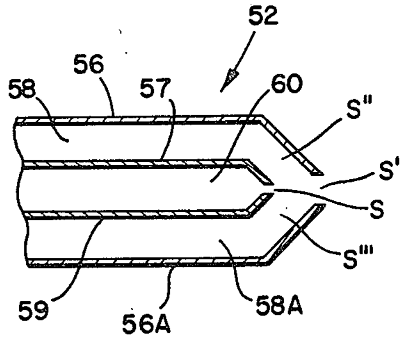
FIG. 2 is an enlarged fragmentary view in section showing a variation of the disc arrangement in the FIG. 1 embodiment.

FIG. 2 discloses a modified form of a distribution disc assembly 52. Here there is added an inner imperforate cover disc 56A preferably mounted on sleeve 59″ of the assembly shown in FIG. 1, thereby defining a third space 58A between discs 59 and 56A. Shaft or tube 53 is provided with suitable openings enabling pressurized air to enter space 58A during operation. The outer peripheries of discs 57 and 59 are inclined toward each other to form an annular discharge outlet S for material space 60. The outer periphery of disc 56A is inclined at about 30°-45° toward disc 56 to define a restricted annular discharge outlet S′ that is surrounded by baffle surface 70. The outer peripheries of discs 56 and 57 are similarly inclined at about 30°–45° to define an annular air discharge outlet S″ for space 58, and the outer peripheries of discs 56A and 59 are inclined at a similar angle to form an annular air discharge outlet S‴ opposite outlet S″. The outlets S″ and S‴ are surrounded by outlet S′ which thereby corresponds to outlet 60″ in FIG. 1.

In operation air under pressure flows outwardly in spaces 58 and 58A and the material from tanks 61 and 62 is forced into space 60. There is considerable turbulence between the parallel peripheral radially aligned outlets S and S′ and the material to be dispersed into the aerosol cloud is even more forcefully thrown out to impact the baffle surface on the housing wall.

Figure 3:
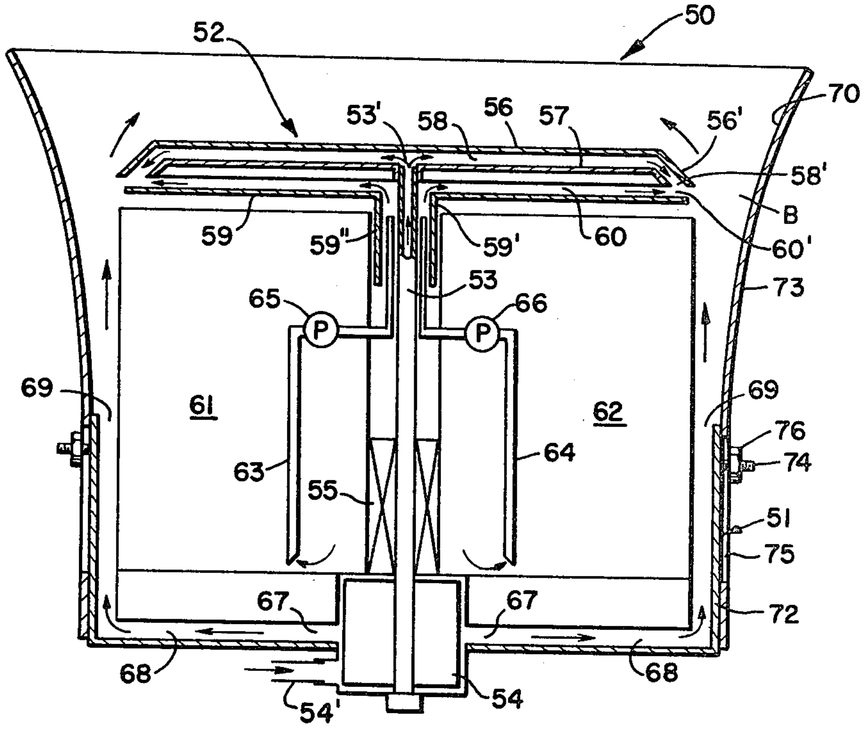
FIG. 3 is a sectional partly diagrammatic view illustrating an aerosol producing device according to another embodiment of the invention.

In the embodiment of FIG. 3, the aerosol producing device 50 comprises a housing 51 having an open end extending past the outer periphery of a distributor disc assembly 52 rotated by a coaxial hollow shaft 53 of an air motor 54 supported by bearings 55 and having an inlet 54′ for compressed air. Suitable means (not shown) direct exhaust air from motor 54 to flow within shaft or tube 53.

Disc assembly 52 comprises an outer imperforate disc 56 fixed on the shaft 53 by means that allows air discharge from shaft 53 into space 58 described below. Disc 56 has an outer peripheral rim 56′ inclined rearwardly at a suitable angle (30°–45°). Inner imperforate disc 57 is secured on shaft 53, preferably with provision for axial adjustment along the shaft, and its outer peripheral rim 57′ is inclined parallel to rim 56′. The foregoing as in FIG. 1 defines a predetermined turbulent air space 58 between the discs that terminates in a first annular discharge outlet 58′ at the outer periphery. Openings 53′ in shaft or tube 53 enable pressurized air from hollow shaft or tube 53 to enter space 58.

Inner imperforate disc 59 is also secured to rotatable shaft or tube 53 as by a perforated spider 59′ so as to define a space 60 between it and disc 57, and space 60 terminates peripherally in a second annular discharge outlet 60′ adjacent outlet 58′. The peripheral outer edges of discs 56 and 59 form a third annular discharge outlet 60″ common to and surrounding the other two outlets as in FIG. 1.

As in FIG. 1 housing 51 extends around tanks 61 and 62 containing the fluent material to be dispersed in the aerosol cloud, and pipes 63 and 64 having adjustable pump units 65 and 66 respectively extend from the tanks into the interior of a hollow sleeve 59″ projecting inwardly from disc 59.

Air motor 54 is connected by inlet 54′ to a suitable source of air pressure (not shown). One outlet of motor 54 is connected to the interior of hollow shaft 53 so that air under pressure may be continually delivered to space 58 during operation. Other motor outlets 67 are connected to conduits 68 leading to the annular longitudinal passage 69 between the housing 51 and the tanks as in FIG. 1.

In FIG. 3 housing wall 51 is comprised of a fixed cylindrical lower inner portion 72 that defines the outer boundary of passage 69 and an outer portion 73 that is longitudinally slidably mounted on portion 72. This may be accomplished by providing threaded elements 74 projecting outwardly through slots 75 in the lower end of outer portion 73, and providing nuts 76 on the ends of elements 74 adapted to be loosened to permit axial adjustment of the outer portion and then tightened to lock the adjustable position. Baffle surface 70 is formed on the adjustable outer portion whereby the effective radial dimension of the region B may be varied for different materials to be dispersed.

In operation motor 54 is driven by air pressure to rotate shaft or tube 53 and the disc assembly 52 at high speed. The motor outlet delivers air under pressure through shaft or tube 53 into space 58, and through conduits 68 into annular passage 69. As in the embodiment of FIG. 1 the fluid material from the tanks is pumped through the pipes 63 and 64 and it enters space 60 wherein it is admixed and thrown outwardly at 60′ to join the pressurized air stream emitted at outlet 58′, and this mixture enters and passes into and through the annular column of pressurized air at reduced velocity higher pressure region B. The impact of material upon baffle surface 70 serves to further subdivide the particles and that coupled with the turbulence of the intersecting air streams in region B results in an efficient aerosol cloud of very fine particles emerging the widened end of the nozzle formed by baffle surface 70.

Figure 4:
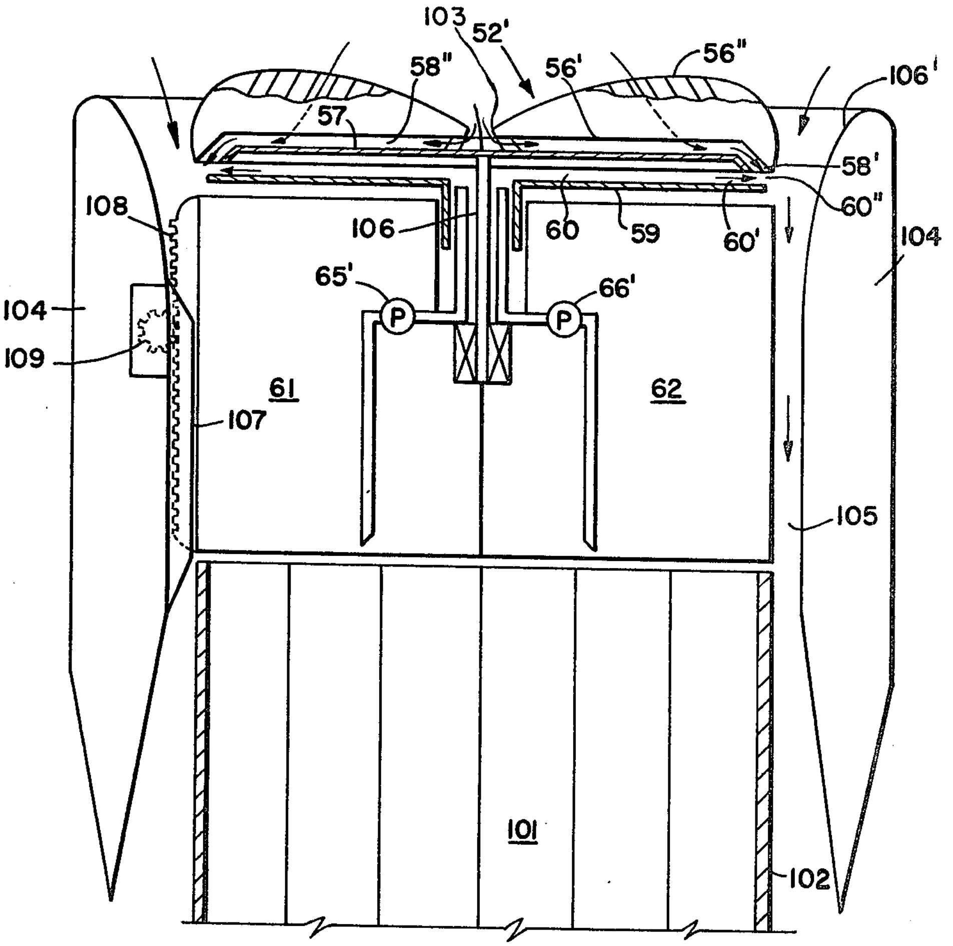
FIG. 4 is a sectional partly diagrammatic view showing an aerosol producing device according to further embodiment, adapted for mounting on a vehicle such as a rocket.

FIG. 4 shows an embodiment wherein the aerosol device 100 is mounted on a rocket or other like self-propelled vehicle.

As shown, power for moving the vehicle is derived from a rearwardly disposed suitable rocket driving set 101 mounted in a cylindrical housing 102, and tanks 61 and 62 are disposed forwardly on an extension of housing 102 and effectively insulated from the power unit. Essentially the arrangement is similar to that of FIGS. 1 and 3 except that the distribution disc assembly 52′ is carried by a rotatably mounted idle shaft 106, and the forward movement of the vehicle results in rotation of the assembly 52′. A surrounding cylindrical aerodynamic ring member 104 defines with the tanks an annular longitudinal passage 105 similar to passage 69 of the other embodiments. As shown the entrance to passage 105 is provided with a rounded smooth baffle surface 106′ that surrounds the periphery of the distribution disc assembly and flares outwardly toward a wider air entrance mouth.

The forward disc 56' is provided with aerodynamic blades 56" secured on the forward end of shaft 106 by a spider or like arrangement providing a coaxial opening indicated at 103 wherein during forward movement of the vehicle and while the disc assembly is being rotated due to air pressure, air enters opening 103 under pressure into space 58" between disc 56' and disc 57 carried by shaft 106.

The ring member 104 is longitudinally slidably connected to stationary members at the outer parts of tanks 61 and 62, there being interengaging longitudinal guide rails and grooves as indicated at 107, a fixed rack bar 108 and an adjustable rotatable toothed element 109 engaged with the rack for locating surface 70 in a desired surrounding relation to the disc assemblies.

In operation the vehicle is set in motion along a selected path through the air powered by the rocket set which may be of any conventional design. The relatively rushing air causes rotation of the disc assembly 52', all of the discs of which are fixed on shaft 106, and established an axially moving annular column of air under pressure in passage 105. As in FIG. 1, the materials from tanks 61 and 62 are forced under pressure into space 60, and the air under pressure supplied through opening 103 to space 58" functions similarly to the FIG. 3 arrangement where air under pressure from the hollow tube shaft enters the corresponding space 58. Valves 65' and 66' are shown in the material delivery pipes. These are remotely adjustably controlled to vary the material feed. Preferably in these mobile units material feed pressure is obtained by pressurized insoluble gas within the tanks.

In this embodiment, of course, the aerosol cloud is delivered rearwardly of the vehicle rather than forwardly as in the embodiments of FIGS. 1 and 3. It is therefore preferable that the control of valves 65' and 66' be such that these valves remain closed until the rocket set is either burned out or turned off, to avoid or reduce damage to the aerosol cloud by the rocket exhaust.

The invention may be embodied in other specific forms without departing from the spirit or essential characteristics thereof. The pressure embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for producing aerosols comprising means providing a supply for fluent material to be dispersed, means defining a distribution device having at least two first substantially parallel disc-like members axially separated by a first space and peripherally formed to provide a first substantially annular discharge outlet for said first space, a third disc-like member separated by a second space from one of said first disc-like members and peripherally formed to coact with said one disc-like member to provide a second substantially annular discharge outlet for said second space, means including the peripheries of two of said members providing a third substantially annular discharge outlet common to said first and second discharge outlets, said first and second discharge outlets being close to each other and said third discharge outlet surrounding said first and second discharge outlets, and said first, second and third discharge outlets having a substantially common axis, nozzle means for providing an annular stream of air moving axially substantially parallel to the said common axis of said discharge outlets and past said third discharge outlet, means defining an air feed passage to said second space whereby during operation air under pressure may be continually fed into said second space to provide a continuous substantially radially directed air stream through said second discharge outlet, means defining a material feed passage between said supply and said first space whereby during operation said material may be continually fed into said first space and transported through said first discharge outlet into said radially directed air stream to form a combined stream of air and material which in turn is substantially radially directed outwardly through said third discharge outlet into and through said axially moving air stream, and an annular baffle surface circumferentially surrounding said third discharge outlet and extending longitudinally therebeyond in the direction of flow of said axial air stream, said baffle surface being disposed in such radial outward location with respect to the third discharge outlet as to be in the direct path of and be impacted by the said stream of air and material thrown outwardly from said distribution device, and said baffle surface being an outwardly flared smooth surface providing an axial passage of changing cross section surrounding said third discharge outlet.

2. The apparatus defined in claim 1 wherein said baffle surface defines the outer boundary for a widening stream of aerosol being discharged.

3. The apparatus defined in claim 1 wherein means is provided for axially adjusting said baffle surface relative to said third discharge outlet.

4. The apparatus defined in claim 1 wherein said distribution device is mounted at the end of a hollow tube serving as said air passage and adapted to convey air under pressure directly to said second space.

5. The apparatus defined in claim 4 wherein said tube is a hollow shaft on which said members are mounted, and means is provided for rotating said shaft.

6. The apparatus defined in claim 5 wherein said means for rotating said shaft is an pneumatic motor having its exhaust connected to provide air to said second space and to said annular stream.

7. Apparatus as defined in claim 1 wherein said apparatus is mobile and provided with a propulsion motor, said distribution device is freely rotatably mounted, and means is provided whereby movement of said apparatus by said propulsion motor causes rotation of said distribution device.

8. Apparatus as defined in claim 7 wherein said distribution device comprises a vaned member rotated by air passing therethrough during movement of said apparatus.

9. Apparatus as defined in claim 7 wherein said distribution device and said motor are mounted on a vehicle body and said body is surrounded by an annular structure defining a passage for said axially moving annular stream.

* * * * *